Aug. 14, 1945.     L. A. SMITH     2,382,113
CUTTER
Filed Aug. 11, 1943
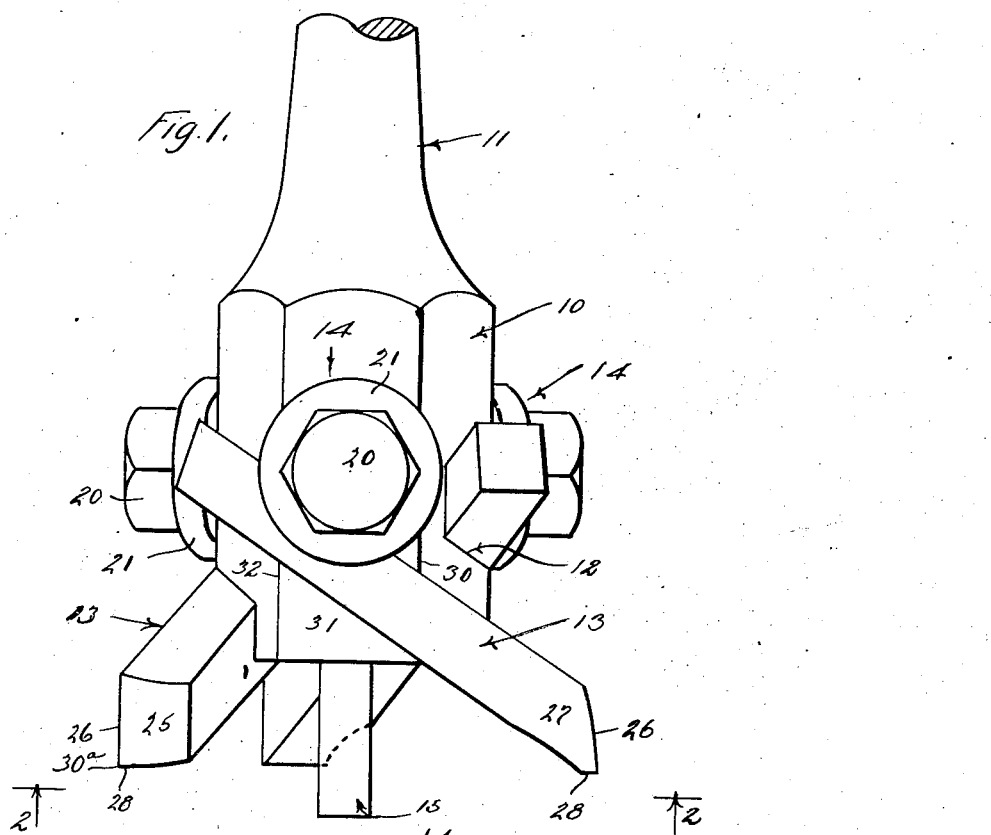
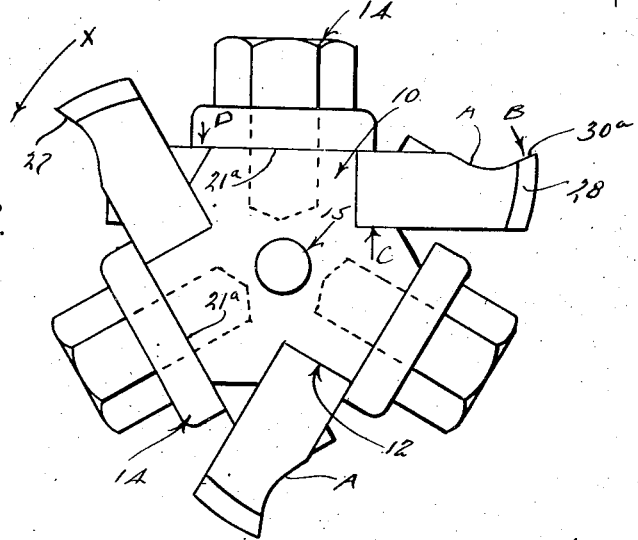
Inventor
Lawson A Smith
by
Attorney Patented Aug. 14, 1945

2,382,113

UNITED STATES PATENT OFFICE 2,382,113

CUTTER

Lawson A. Smith, Los Angeles, Calif., assignor to Robert H. Clark, Los Angeles, Calif.

Application August 11, 1943, Serial No. 498,213

3 Claims. (Cl. 77—69)

This invention has to do with a cutter and has particular reference to features of construction applicable to cutters used for boring or facing and more particularly it relates to cutters of the type in which there is a central or main body carrying a plurality of separate cutters. It is a general object of the present invention to provide an improved construction and arrangement of parts in a tool of the character mentioned.

In cutting tools, and particularly in tools used in machine operations, it is essential that the cutting parts be accurately and firmly supported, as otherwise it is difficult, if not impossible, to obtain accurate results or the cutting action is not smooth or finished. It is desirable from many standpoints to provide a cutting tool having a central or main body carrying detachable or replaceable cutters. Such tools, however, present certain limitations or difficulties, one of the main difficulties being that of gaining sufficient rigidity. For many operations it is essential that the cutters or cutting parts be securely and rigidly held in the desired positions and with a sectional construction or a build-up device difficulty has been experienced in gaining this end.

It is also highly important in tools of the character and type referred to that the construction employed be simple and inexpensive of manufacture and that the cutters be mounted in a manner so that they can be readily and accurately adjusted.

A cutter of the general type to which I refer is the subject of my copending application entitled "Cutting tool" filed May 7, 1943, Serial No. 485,984. In that application I show a cutting tool wherein there is a polygonal body having angularly disposed channels in its sides to carry cutters which are secured in the channels by suitable clamping devices applied to the body. This construction is, in general, desirable as it is simple of manufacture and use, is sufficiently rigid for many purposes, and it has been found to be commercially practical.

It is an object of my present invention to provide improvements in a cutter of the type which is the subject of my said copending application. By the present invention I have provided a structural arrangement and combination of parts which makes the assembly more rigid and consequently more suitable for certain classes of work, particularly for heavy work or those types of work which require extreme accuracy and rigidity.

It is a further object of my invention to provide a cutter of the general type which is the subject of my said copending application wherein the several cutting parts or cutters are supported by means of the main body so that the main load or thrust borne by the cutter is transmitted or communicated to the body as close as possible to the actual cutting edge. By my present invention each cutter is supported in a channel formed in the body and the arrangement is such that the forces or loads borne by the cutter are communicated directly to the bottom of the cutter-carrying channel where the cutter leaves the channel to project to the work. In other arrangements, such as the arrangement shown in my said copending application, the cutters and body are related so that the forces or strains incidental to operation are mainly communicated to the body through the retaining means, there being a tendency for the cutter to lift from the channel where it leaves the channel to project to the work. In other words, with the old construction the cutter is subject to spring from the point where it engages the work to the point where it is held by the retaining means, whereas in my improved construction the bottom of the cutter-carrying channel supports the cutter against spring or give at the point where the cutter leaves the body to project to the work.

The various objects and features of my invention will be fully understood from the following detailed description of a typical preferred form and application of my invention, throughout which description reference is made to the accompanying drawings, in which:

Fig. 1 is a side elevation of a typical cutting tool embodying the present invention and Fig. 2 is an end elevation of the tool, being a view taken substantially as indicated by line 2—2 on Fig. 1.

My present invention may be embodied in various forms or types of cutters but is most practical and advantageous in the general type of cutter which is the subject of the said copending application. In that type of cutter there is a main or central body 10 having a supporting shank 11, a plurality of angularly disposed cutter-carrying channels 12 in the sides of the body, cutters 13 carried in the channels to project outwardly therefrom and beyond the lower end of the body, and retaining means 14 for the cutters operating to retain the cutters in the channels. The tool may be provided with a pilot 15 either in the form of a pilot drill or a plain pilot shank, as circumstances may require.

The body 10 in its preferred form is polygonal in cross section, preferably hexagonal, and is made sufficiently long to properly accommodate the cutters and the retaining means as will be hereinafter described.

The shank 11 serves as the means for mounting the body 10 in a machine or operating device and is preferably formed integral with the body. For ordinary machine shop use the shank 11 may be tapered in a manner such as is illustrated in the drawing.

The cutter carrying channels 12 are provided in the sides of the body 10 to carry the several cutters 13. In the preferred construction there are three cutters 13 in which case there is a cutter-carrying channel 12 in every other side around the body 10. The channels are formed to carry the cutters and to that end they are shaped and proportioned according to the particular cutters being used.

In common practice the cutters are substantially square in cross-section and consequently the channels 12 are made substantially square to accurately receive the cutters. The channels are angularly disposed at the sides of the body, it being preferred in practice to pitch them at an angle of about 38° from a plane normal to the longitudinal axis of the body. Further, in practice it is desirable to locate the cutter-carrying channels so that they open at the bottom of the body in the manner illustrated in the drawing. It is to be understood, of course, that the cutter-carrying channels 12 are all pitched equally and formed in like manner so that the several cutters are held by the body to project downwardly and outwardly from the body at corresponding angles.

The cutters 12 are individual cutting tools formed of stock preferably square or substantially square in cross section. The outer end portion of each cutter 13 is dressed or finished to present a cutting head which I will hereinafter refer to in detail.

The retaining means 14 provided for retaining the cutters in the channels preferably includes cap screws 20 threaded into the sides of the body which are channeled to hold clamp plates 21 which engage over the cutters. There is one cap screw and one clamp plate for each cutter, the cap screw being threaded into the body adjacent the channel and the clamp plate being in the nature of a washer or collar carried on the cap screw to overhang the cutter. The clamp faces 21a of the plate are preferably knurled or roughened so they effectively grip the cutters.

In accordance with my present invention the cutter-carrying channels are angularly disposed in the sides of the body 10 so that the cutters are pitched to project in a direction outward and downward from the lower end of the body and also to project rearwardly with reference to the direction of rotation of the cutter. Referring to Fig. 2 of the drawing the direction of rotation of the cutter is indicated by the arrow X. It will be noted that if the cutter is viewed from the bottom and is considered rotating in the direction indicated by the arrow X, the cutters projecting from the bottom of the body instead of projecting forwardly from the body with reference to the direction of rotation, project rearwardly therefrom. In other words the ends of the channels from which the cutters project issue from the trailing edges 30 of the sides 31 in which the channels are formed and not from the leading edges 32 thereof.

With the cutters thus disposed or, in other words, carried by the body 10 so that they project downwardly and outwardly from the bottom end of the body and rearwardly with reference to the direction of rotation of the cutter, the cutting heads or cutting ends of the cutters are dressed to present proper cutting parts. The cutting end of each cutter is dressed to have a flank portion 25 which recedes from what may be termed the leading, substantially vertical edge 26. The flank is curved to be concentric with the principal axis of the tool when the cutter is withdrawn or set in a retracted position somewhat inward of the smallest opening to be cut by the tool. When thus formed the shank 25 has side clearance behind the edge 26 when the tool is operated. The vertical leading edge 26 may be finished to be parallel with the principal axis of the tool so that it operates to finish or ream the bore made by the tool, or it may, as illustrated, be pitched upwardly and inwardly to give it a slight side clearance. The front or leading face 27 is dressed so that the cutter has a suitable back slope to give the cuttings clearance. This slope, together with the bottom face 28, defines the keenness of the cutter. The bottom face 28 is preferably dressed to extend rearwardly and slightly upward from the point where it intersects the forward face 27 so that there is bottom clearance. The line of joinder of the forward face 27 and the bottom face 28 forms or defines a bottom cutting edge 30a. It is to be understood that the particular shape or manner of dressing the cutting parts of the cutters will depend upon the work to be done by the tool.

In accordance with my invention, when the cutter is bodily projected rearwardly with reference to the direction of rotation of the tool it is necessary to dress away the forward portion of the cutting end of the cutter as indicated at A in order to obtain the proper angle on the leading face 27, since it is desirable that the cutting face 27 be such as to recede somewhat, as clearly shown in Fig. 2, from a line radial from the center of the tool.

In accordance with the principle taught in my said copending application it is preferred, in practice, to dress the several cutters so that there is some variation in them, for instance, one of the cutters is dressed so that the face 27 is at an angle different than the corresponding face of the other cutters, in order to eliminate chatter.

The pilot 15, as I have stated, may be a drill or it may be a single pin such as I have shown in the drawing. It is to be understood, of course, that so far as the present invention is concerned, the device may be provided with a pilot or it may be without a pilot as circumstances require.

With the arrangement and construction that I have described the strains or forces incidental to the cutting operation are communicated from the cutters to the body in the most advantageous manner and so as to eliminate tendency for spring or give to occur in the structure. Referring to Fig. 2 it will be apparent that as the cutter is rotated in the direction indicated by the arrow X and the tool is fed into the work, a force is set up in each cutter in the direction indicated by the arrow B, tending to force the outer end of the cutter back. This force is mainly taken up or resisted by the supporting action of the outer end portion of the cutter-carrying channel by a resistance occurring substantially as indicated by the arrow C. The tendency for the upper or innermost end portion of the cutter to lift out of its channel is resisted by the retaining means substantially as indicated by the arrow D. It will be apparent from the forces thus diagrammed that the principal load or strain of work is communicated by the cutter directly to the bottom of the channel where the channel opens out at the lower end of the body, and in this way the cutter is supported in the most advantageous manner and there is little or no tendency for the parts to work or spring.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. In a rotary cutting tool of the character described, a central body having a shank at one end and angularly disposed cutter carrying channels in its sides pitched to extend toward its other end and rearward of the direction of rotation of the tool, elongate cutters with inner and outer sides and each having a cutting edge at its outer end faced to cut substantially laterally of its length in the direction in which the outer side faces, the cutters being carried in the channels with their inner sides bearing on the bottoms of the channels and their outer end portions projecting beyond said other end of the body and rearwardly of the direction of rotation of the tool whereby as the body rotates forces set up by working of the cutting edges tend to seat the cutters in the channels, and means retaining the cutters in the channels.

2. In a rotary cutting tool of the character described, a central body having a shank at one end and having cutter channels disposed tangentially in its sides and inclined relative to the longitudinal axis of the tool so the lower end portion of each channel extends toward the other end of the body and rearwardly of the direction of rotation of the tool, an elongate cutter in each channel projecting beyond the lower end of the channel and having a cutting part at its lower end facing in the direction of rotation of the tool to cut as the tool rotates so pressure caused by cutting tends to seat the cutter in the channel, and means retaining the cutters in the channels.

3. In a rotary cutting tool of the character described, a central body having a shank at one end and an angularly disposed cutter carrying channel in its side pitched to extend toward its other end and rearward of the direction of rotation of the tool, an elongate cutter with inner and outer sides and having a cutting edge at its outer end faced to cut substantially laterally of its length in the direction in which the outer side faces, the cutter being carried in the channel with its inner side bearing on the bottom of the channel and its outer end portion projecting beyond said other end of the body and rearwardly of the direction of rotation of the tool whereby as the body rotates forces set up by working of the cutting edge tends to seat the cutter in the channel, and means retaining the cutter in the channel.

LAWSON A. SMITH.